United States Patent [19]
Groh et al.

[11] Patent Number: 5,558,809
[45] Date of Patent: Sep. 24, 1996

[54] POLYMER ELECTRETS WITH IMPROVED CHARGE STABILITY

[75] Inventors: Werner Groh, Lich; Hans-Tobias Macholdt, Darmstadt-Eberstadt, both of Germany; Baylor D. Gibson, Weddington, N.C.; James R. Walden, Matthews, N.C.; Clinton D. Felton, Charlotte, N.C.

[73] Assignee: Hoechst Celanese Corporation, Somerville, N.J.

[21] Appl. No.: 540,507

[22] Filed: Oct. 10, 1995

Related U.S. Application Data

[63] Continuation of Ser. No. 357,357, Dec. 15, 1994, abandoned, which is a continuation of Ser. No. 28,439, Mar. 9, 1993, abandoned.

[51] Int. Cl.[6] .................................................. G11C 13/02
[52] U.S. Cl. ..................... 252/62.54; 252/500; 252/518; 307/400; 430/110
[58] Field of Search ............................ 252/62.54, 62.9, 252/567, 500, 518; 307/400; 430/110

[56] References Cited

U.S. PATENT DOCUMENTS

| | | |
|---|---|---|
| 2,740,184 | 4/1956 | Thomas . |
| 3,571,679 | 3/1971 | Van Turnhout . |
| 4,215,682 | 8/1980 | Kubik et al. . |
| 4,308,223 | 12/1981 | Stern . |
| 4,375,718 | 3/1983 | Wadsworth . |
| 4,623,438 | 11/1986 | Felton et al. . |
| 4,789,504 | 12/1988 | Ohmori et al. . |
| 4,944,854 | 7/1990 | Felton et al. . |
| 5,057,710 | 10/1991 | Nishiura et al. ................. 307/400 |
| 5,073,579 | 12/1991 | Macholdt et al. ............... 524/255 |
| 5,187,038 | 2/1993 | Gitzel et al. .................... 430/110 |
| 5,475,119 | 12/1995 | Baur et al. ...................... 548/570 |

FOREIGN PATENT DOCUMENTS

| | | |
|---|---|---|
| 4031705 | 4/1992 | Germany . |
| 56-138715 | 10/1981 | Japan . |
| 59-78361 | 7/1984 | Japan . |
| 62-42716 | 2/1987 | Japan . |

OTHER PUBLICATIONS

Chemical Abstract CA117(6):58873n0, 1992.
Chemical Abstract CA117(10):100967y, 1992.
Chemical Abstract CA119(8):828756, 1993.
Nath and Perlman, Journal of Electrostatics, vol. 24 (1990) pp. 283–293 (Month Unknown).

*Primary Examiner*—Prince Willis, Jr.
*Assistant Examiner*—Alan D. Diamond
*Attorney, Agent, or Firm*—Philip P. McCann

[57] ABSTRACT

The use of additives to produce polymer electrets with improved charge stability. In particular, the invention relates to the use of specific charge control agents used for toners that are blended with various polymers at suitable concentrations to enhance the charge lifetime of the electrets. The charge control agents include a triphenylmethane compound, a polymeric ammonium compound, and arylsulfide compound and azochromium complex.

1 Claim, 8 Drawing Sheets

POLYMER ELECTRETS WITH IMPROVED CHARGE STABILITY

This is a continuation of copending application Ser. No. 08/357,357 filed on Dec. 15, 1994, now abandoned, which is a continuation of Ser. No. 028,439 filed on Mar. 9, 1993 now abandoned.

This invention relates to the use of additives to produce polymer electrets with improved charge stability. More particularly, this invention relates to the use of Charge Control Agents blended with polyolefins or other polymers at concentrations of 0.01–30% wt., preferably 0.1–5% wt., to significantly enhance the charge lifetime of said electrets.

It is known that certain dielectric materials can be permanently electrostatically polarized. These materials are polarized by exciting the material by heating, applying a high-voltage electric field, and cooling the material while under the influence of the electric field. Upon the removal of the electric field, appropriate dielectric materials will be found to have become the electrical equivalent of a permanent magnet. A dielectric becomes an electret when the rate of decay of the field-induced polarization can be slowed down so much that a significant fraction of the polarization is preserved long after the polarizing field has been removed. Such electrets can be created by various methods, e.g. corona charging, triboelectric charging (friction), or any other charging technique (e.g. by liquid contact).

It is known that air filters made of electret fibers are very effective in removing submicron aerosols. The electrostatic collection mechanism increases the efficiency of these electrostatically charged fibrous non-woven materials relative to conventional, uncharged fibers. The filters have increased ability for the mechanical capture of particles with no corresponding increase in pressure drop. The use of electrets has also been investigated in the medical field, i.e., wound healing and blood compatibility, as well as in dosimetry, where charged polymer films are used to determine radioactive exposure.

Early methods for the formation of fibrous electrets from thermoplastic films or filaments involved disposing the thread or filaments in an electrostatic field established between parallel closed spaced electrodes. (U.S. Pat. No. 2,740,184.) Another method for forming electrets is disclosed in U.S. Pat. No. 3,571,679. This method involves a process for forming electrets by closely winding a monofilament fiber such as a polypropylene fiber on a hollow winding roller which has been previously surfaced with a polyamide faced aluminum foil. This process however is discontinuous and extremely slow in that charging times of three hours or so for the wrapped roll are required.

Now electrets are commonly produced by a number of methods which differ in both the manufacturing/charging technology and polymer material used.

In one method, as shown in U.S. Pat. Nos. 4,308,223 and 4,375,718, a polymer film is initially passed across a corona discharge which impacts positive and negative charges on opposite sides of the film. The film is then mechanically split into small filaments which are subsequently formed into a filter mat. In a second commonly used method, as disclosed in U.S. Pat. No. 4,215,682, a polymer melt is charged by applying a high voltage during the fiber spinning process. A third, more recent process is described by Felton et al. in U.S. Pat. Nos. 4,623,438 and 4,944,854. In these patents, a charge is released between fine wires and a surface electrode. The wires are biased with an electrostatic potential of several kilovolts. The structure to be charged, be it fiber or fabric, is positioned between the electrodes. This is referred to as the "Corona" technique.

Another method described in the literature (P. A. Smith, G. C. East; Journal of Electrostatics, 21 (1988)81–88) is triboelectric charging. In this process, two or more polymers are brought in close contact and, due to their different dielectric properties, charge is transferred from one to the other. After taking both polymers apart they are left in a charged state. Triboelectric exchange of charge was shown to be useful as having a good effect in the construction of air filters.

Many types of polymers have been investigated for use as air filters made of electret fibers. Suitable polymers for electrets are polyolefins, e.g. polypropylene or polyethylene, polycondensates, e.g. polyamides, polyesters, polycarbonates or polyarylates, polyacrylates, polyacetales, polyimides, celluloseesters, polystyrenes, fluoropolymers and polyphenylenesulfide. Also suitable are combinations of polymers, e.g. co-polymers and polymer blends. General material requirements and performance characteristics of suitable electret polymers are described, for example, in the book of G. Sessler: Topics in Applied Physics, Vol. 33: "Electrets", Springer Verlag, London, 1987.

Some of the characteristics of suitable electret polymers include long-term charge stability as well as resistance to humidity and chemicals. It is known, for example, that certain kinds of fluoropolymers such as polytetrafluoroethylene (PTFE) or perfluorinated ethylene/propylene copolymer (PFEP) are excellent electrets with charge lifetimes in the range of several to tens of years. These polymers also have very good temperature stability and low moisture regain. However, these polymers are expensive, difficult to process and therefore not widely used in commercial filter fabrics.

More economically and possessing very good electret performance are polyolefins such as polypropylene or polyethylene and polycarbonates. These polymers provide good chemical and mechanical stability to the filter fabric. However, charge lifetimes on the order of only 1 year are provided with these fabrics which is not always sufficient for use as clean room filters or car interior filters. For an electret to maintain its high efficiency, its lifetime must be in excess of the actual use-time plus the typical shelf-time, that is, the time between production and use. It is therefore highly desirable to identify better performing and use stable, but nonetheless economical materials similar to the polyolefins.

It is known to use certain additives to improve the efficiency of electret performance. Nath and Perlman, Journal of Electrostatics, 24 (1990), 283–293, disclose the use of 10% titanium dioxide as an additive to improve the half-life temperature in polyarylate from 126° C. to 180° C. However, it was found that a significant effect could only be observed when using additive concentrations of 5% or larger which would be likely to deteriorate the polymer's mechanical properties. It was also found that the additive caused an increase in humidity sensitivity which would be detrimental for commercial applications such as air filters.

U.S. Pat. No. 4,789,504 to Ohmori et al. discloses an electretized material for a dust filter which is made of an insulating polymer material such as polypropylene together with a fatty acid metal salt in an amount not less than 100 ppm. The fatty acids exemplified are magnesium stearate and aluminum palmitate.

According to the present invention, it has been discovered that Charge Control Agents, such as those used in toners for electro-photographic processes are particularly suitable to improve the charge stability of polymer electrets. These agents blended with polyolefins or other polymers in concentrations of 0.01–30% wt. significantly enhance charge lifetime. Charge Control Agents have been selected to be used as additives because these agents gain a maximum charge in a triboelectric process. It was also found that Charge Control Agents disperse homogeneously in the polymer matrix and while acting as charge traps improve homogeneity of the charge distribution. As known from the literature, charge distribution in films or fibers is usually very inhomogeneous and unpredictable.

There is no general understanding as to how the Charge Control Agents work. In the electrophotographic process, they are used to give the needed chargeability to toner powders and are responsible both for the polarity and magnitude of the electrostatic charge.

These Charge Control Agents are from various chemical classes and suitable ones for use with polymer electrets include:

a) triphenylmethanes as described in U.S. Pat. No. 5,061,585;

b) ammonium and immonium compounds, as described in U.S. Pat. No. 5,015,676;

c) intensely fluorinated ammonium and immonium compounds as described in U.S. Pat. No. 5,069,994;

d) biscationic acid amide and acid imide derivatives as described in World. Patent Application 91/10172;

e) polymeric ammonium compounds as described in German Patent Application 4,029,653;

f) diallylammonium compounds as described in U.S. patent application Ser. No. 07/992,043;

g) arylsulfide compounds as described in German Patent Application 4,031,705;

h) phenolic compounds as described in European Patent Application 025 8651, respectively compounds of the CAS-No. 41481-66-7 and 13288-70-5;

i) phosphonium compounds as described in U.S. Pat. No. 5,021,473;

j) highly fluorine-substituted phosphonium compounds as described in U.S. Pat. No. 5,147,748;

k) calix(n)arene compounds as described in European Patent Application 0385580 A1 and European Patent Application 0516434;

metal complex compounds like chromium-, cobalt-, iron-, zinc- or aluminum azocomplexes or chromium-, cobalt-, iron-, zinc- or aluminum salicyclic acid complexes as described in European Patent Application 0 162632 A2, U.S. Pat. No. 4,908,225, EP 393479, EP 360617; EP 291930; EP 280272, EP 255925; EP 251326: EP 180655, EP 141377, U.S. Pat. No. 4,939,061, U.S. Pat. No. 4,623,606, U.S. Pat. No. 4,590,141 and/or described by CAS-Numbers 31714-55-3, 104815-18-1, 84179-68-8, 110941-75-8, 32517-36-5, 38833-00-00, 95692-86-7, 85414-43-3, 136709-14-3, 135534-82-6, 135534-81-5, 127800-82-2, 114803-10-0, 114803-08-6 and the like;

m) benzimidazolon compounds as described in European Patent Application 0 347 695 A2; or n) azines of the following Color Index numbers, C. I. Solvent Black 5, 5:1, 5:2, 7, 31, 50; C.I. Pigment Black 1, C.I. Basic Red 2 and C.I. Basic Black 1 and 2.

As shown in Examples 1–7, these Charge Control Agents significantly improve the charge stability of polypropylene electrets. A similar effect was found for other polymers like polyesters or polyarylates.

The compounds used according to the invention are as a rule incorporated homogeneously into the particular polymer in a concentration of about 0.01 to 30% wt., preferably about 0.1 to 5.0% wt. in a known manner, for example by extrusion or kneading. The Charge Control Agents can be added to the polymer as dried and ground powders, dispersions or solutions, press-cakes or a masterbatch, and as compounds absorbed on suitable carriers. The compounds employed according to the invention can also be added directly during preparation of the particular polymers, that is to say in the course of their polymerization, polyaddition or polycondensation.

For the purpose of this invention, Charge Control Agents can be used either as a single component, i.e. a specific chemical compound, or a mixture of two or more Charge Control Agents.

The following examples are given for illustrative purposes and are not to be construed as limiting the invention described herein. All temperatures are in degrees Centigrade (°C.) unless otherwise designated.

EXAMPLE 1

Polypropylene granules (REXENE®) were ground and blended with 1% wt. of the arylsulfide compound of the formula The synthesis of this compound is described in German Patent Application 4,031,705, example 5.

The mixture was then homogenized for 2 hours in a tumble mixer and dried in an oven for 4 hours at 140° C. The blend was poured into a twin-screw melt extruder and extruded to a 4 inch wide, 10 mil thick film. The melt temperature was 260° C and the die temperature 280° C.

Film samples of 2 inches in diameter were cut and clamped in a circular holder. An aluminum electrode of 1.5 inches diam. and 100 nanometer thickness was evaporated on one side of the film. The sample was placed on a metal plate, heated to 135° C. and exposed to a corona discharge for 3 minutes, imparting a negative charge on the uncovered side of the sample. During the charging procedure, the aluminum coated surface was connected to ground potential. After charging was completed, the sample was taken from the heating plate and allowed to cool. The resulting surface potential, measured with an electrostatic voltmeter, was −615 Volts.

After being stored for 14 hours at ambient conditions, the sample was inserted in the Thermally Stimulated Current (TSC)-unit and heated at a constant rate of 2° C./minute. During this heating procedure, the polarization current was recorded with an electrometer.

Figure 1:
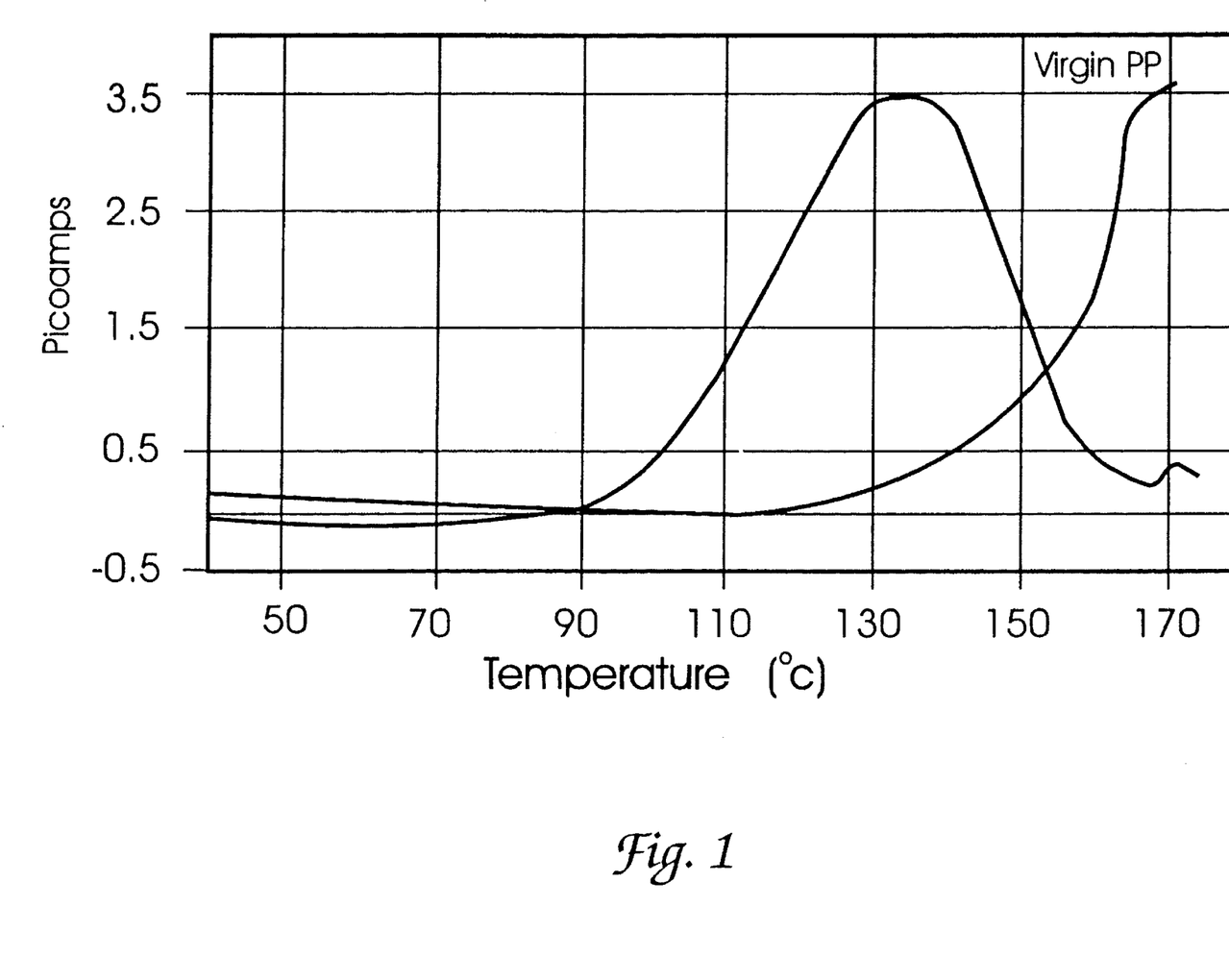
FIG. 1 is a graph showing the TSC spectrum of Example 1.

Results are shown in FIG. 1. The sample containing the additive shows a strong current peak centered at 136° C. which does not occur with the virgin PP-sample. The steep rise in current at 150° C. for the virgin sample is due to the beginning of film softening and degradation.

For further evaluation of the peak at 136° C., the method described by Sessler and West (J. Electrochem. Soc.: Solid State Science, Vol. 115(8), 1968, 836–841) and Perlman (J. Electrochem. Soc.: Solid State Science and Technology, Vol. 119(7), 1972, 892–898) was used. The so calculated trap activation energy was 1.1 eV and the extrapolated room-temperature lifetime >2 years.

EXAMPLE 2

Figure 2:
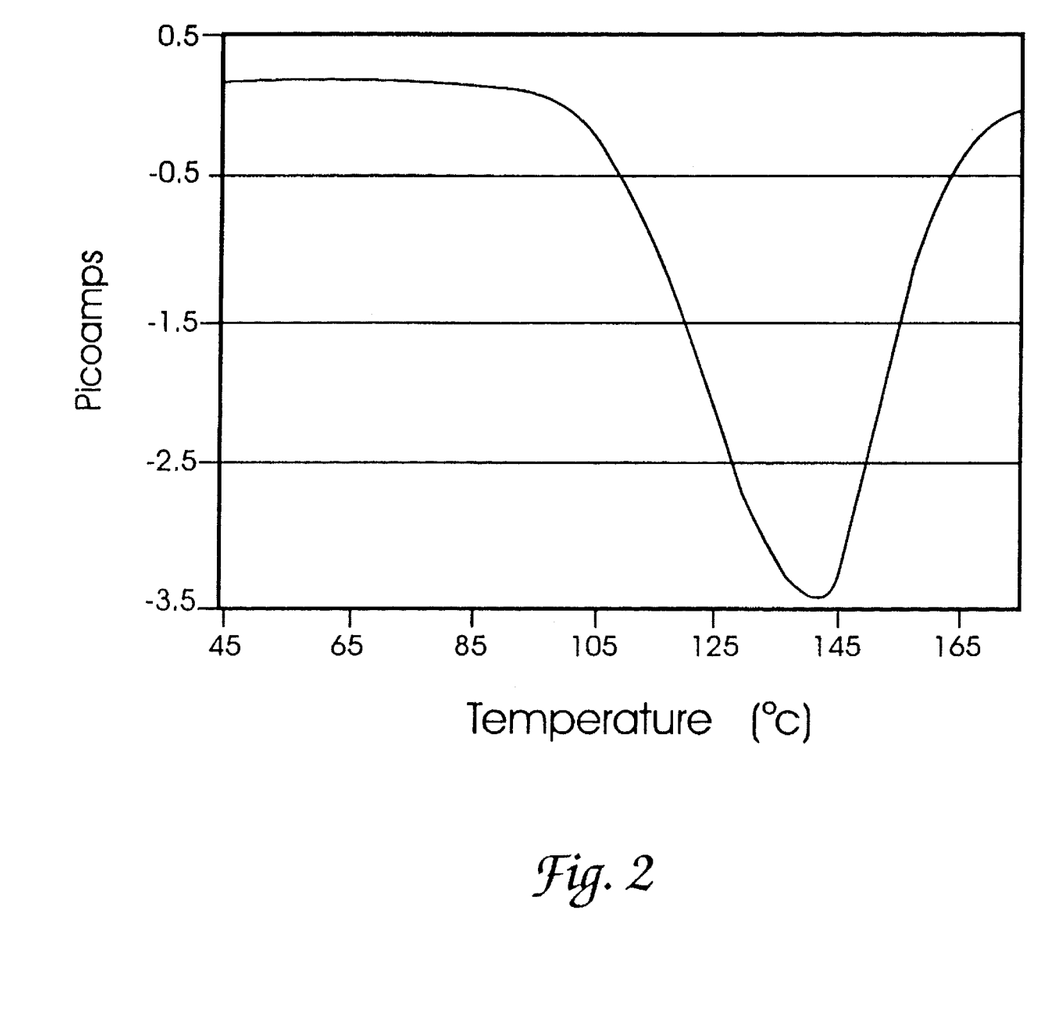
FIG. 2 is a graph showing the TSC spectrum of Example 2.

A sample was prepared and treated as described in Example 1 but positively charged in the corona discharge. The resulting TSC-spectrum is shown in FIG. 2. A current peak was observed at 143° C., resulting in a calculated trap activation energy of 1.2 eV and an estimated room-temperature lifetime of >6 years.

EXAMPLE 3

Ground polypropylene was blended with 1% wt. of the polymeric ammonium compound based on the monomer of the formula the synthesis of this compound is described in DE-OS 410 3610 "Herstellungsbeispiel 2".

Figure 3:
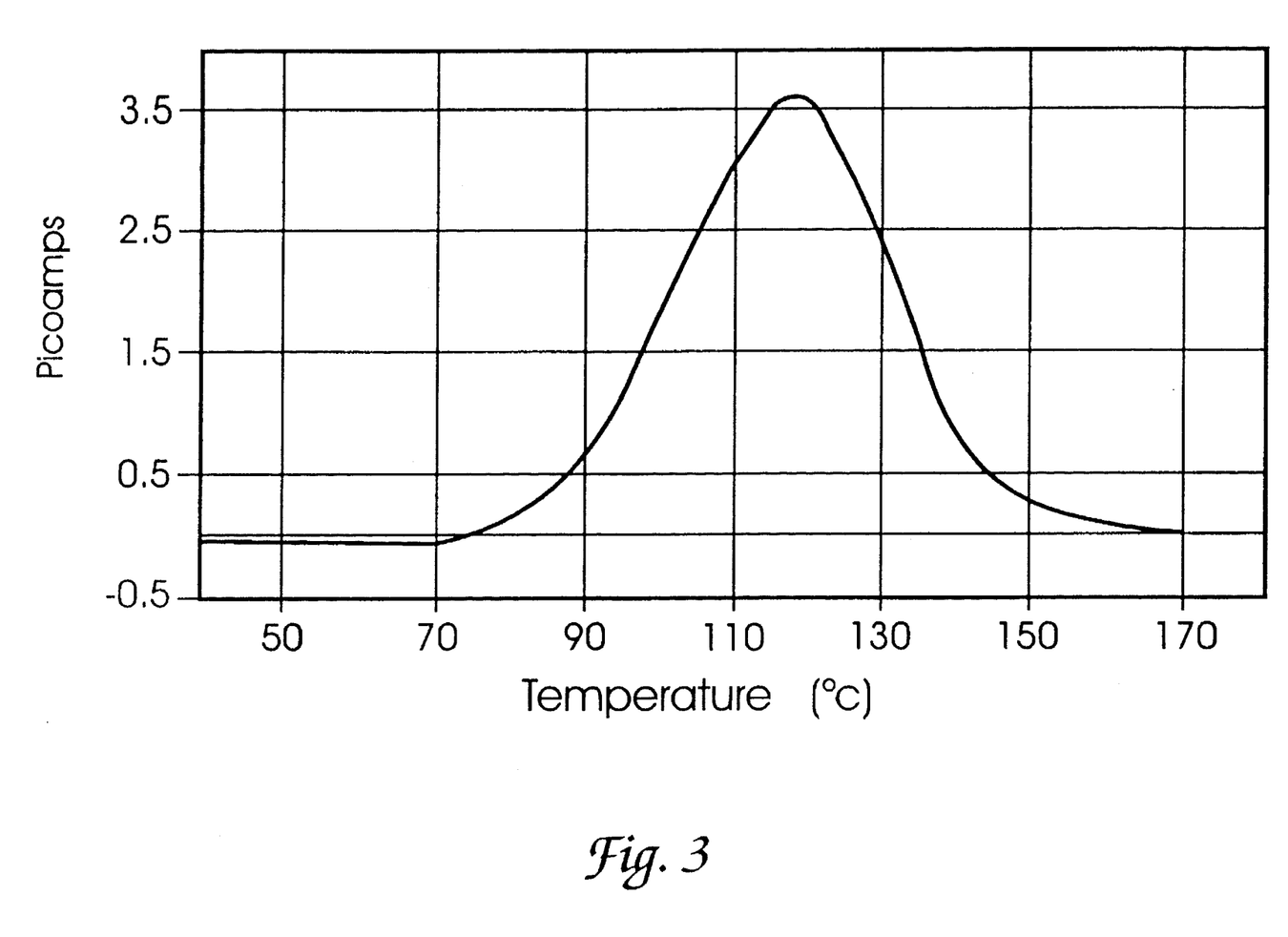
FIG. 3 is a graph showing the TSC spectrum of Example 3.

A film was processed and charged negatively as described in Example 1. FIG. 3 shows the corresponding TSC-spectrum. A peak at 119° C. was observed, corresponding to a calculated trap activation energy of 1.3 eV and a room-temperature lifetime >1 year.

EXAMPLE 4

As described in Example 1, a film was prepared with 1% wt. of the triphenylmethane compound of the formula The synthesis of this compound (Solvent Blue 124, CI No. 42762) is described in German Patent 1,919,724, respectively in U.S. Pat. No. 5,061,585, example 1.

Figure 4:
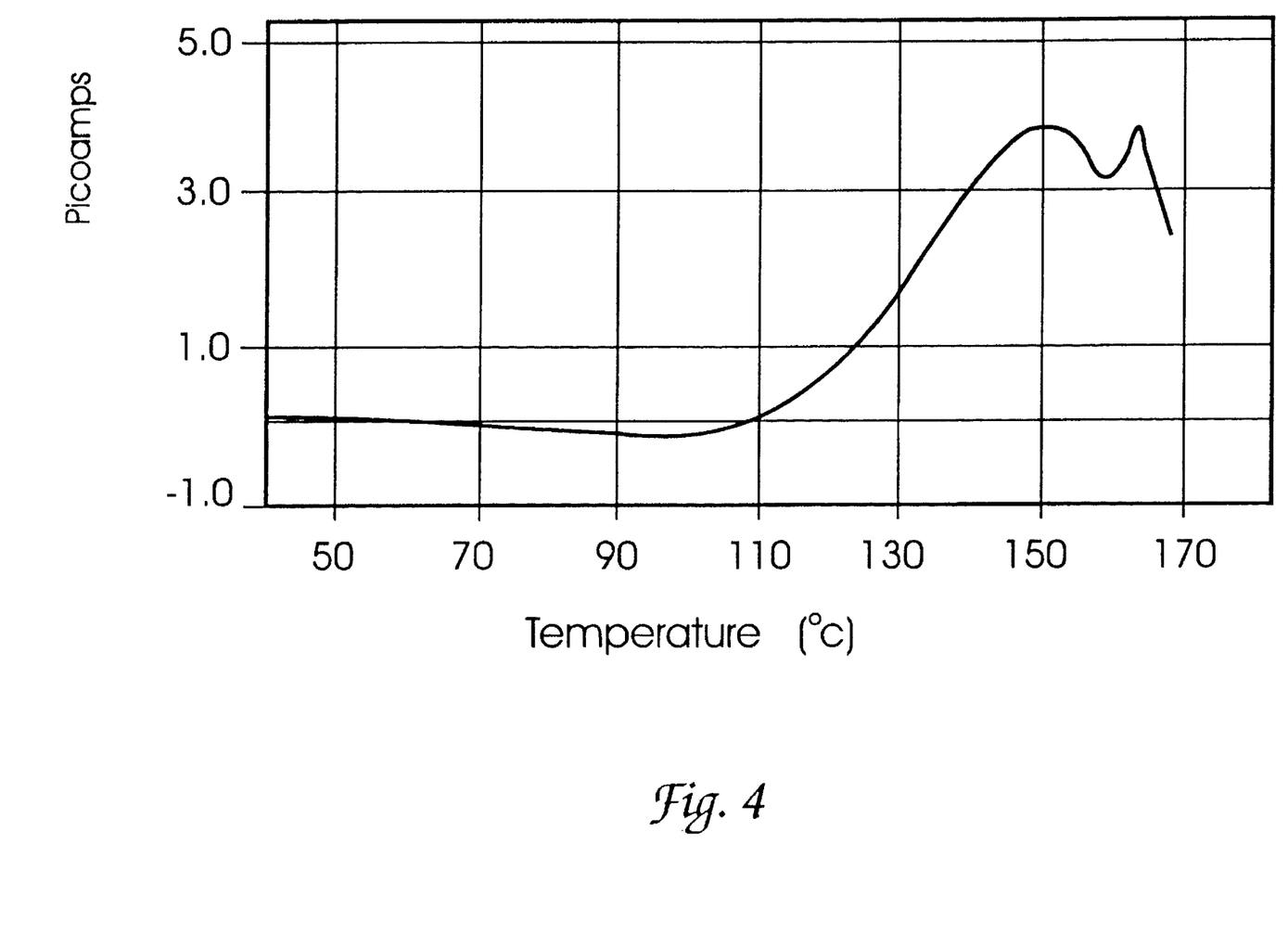
FIG. 4 is a graph showing the TSC spectrum of Example 4.

The sample was negatively charged at 135° C. The resulting TSC-spectrum is shown in FIG. 4. A peak centered at about 148° C was observed. Activation energy and room-temperature lifetime could not be determined, because the falling part of the peak overlapped with a signal caused by sample degradation. However, it can be estimated from the peak position that the trap activation energy is well above 1 eV and the room-temperature lifetime is in the range of several years.

EXAMPLE 5

Figure 5:
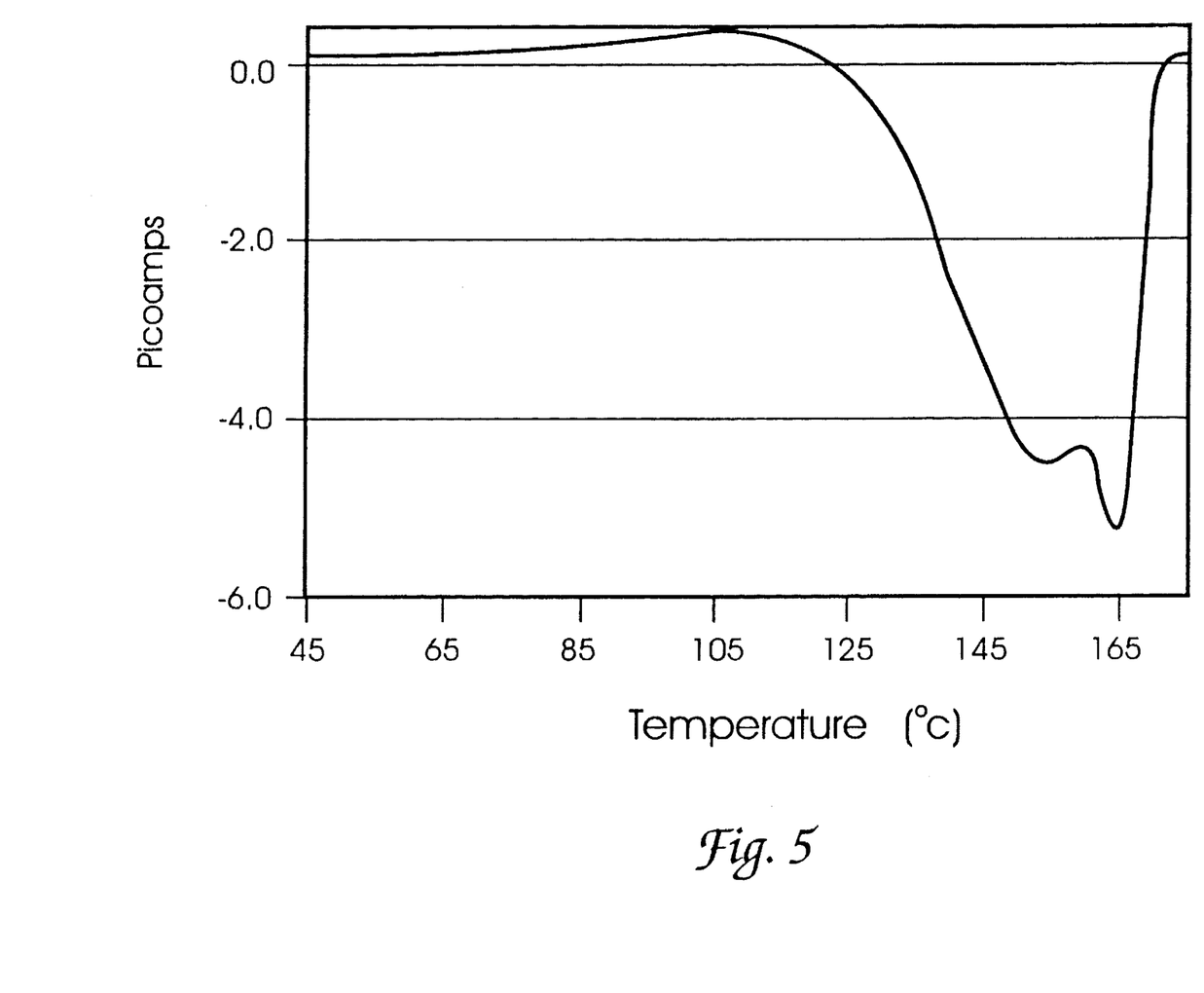
FIG. 5 is a graph showing the TSC spectrum of Example 5.

A film sample, as described in Example 4, was charged positively at 135° C. The corresponding TSC-spectrum given in FIG. 5 revealed a peak at 156° C. close to the polymer's failing temperature. Due to the overlap, activation energy and lifetime could not be evaluated, but the peak position is an indicator for a lifetime of at least several years.

EXAMPLE 6

As described in Example 1, a film was prepared with 1% wt. of the azochromium complex of the formula this compound has the CAS-Nr. 31714-55-3 and the synthesis is described in the literature.

Figure 6:
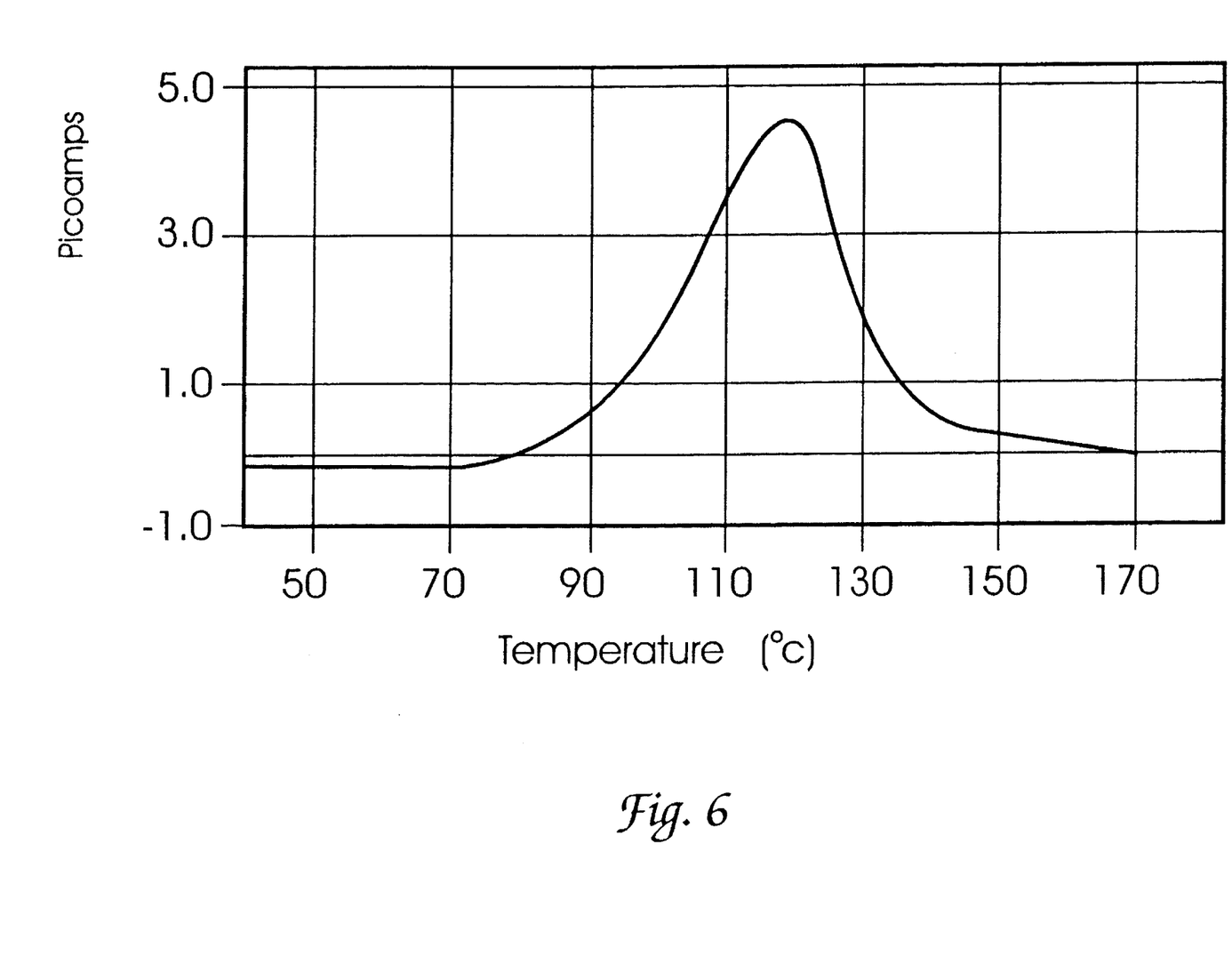
FIG. 6 is a graph showing the TSC spectrum of Example 6.

The sample was charged negatively at 135° C. The corresponding TSC-spectrum is depicted in FIG. 6, showing a peak centered at 117° C. The calculated activation energy is 1.2 eV and the extrapolated room-temperature lifetime is 1 year.

EXAMPLE 7

One ounce per square yard (1 osy) melt blown electret webs were made from polypropylene (PP) and PP +5% of the triphenylmethane compound described in example 4. Fibers were corona charged as they exited the 6" die. Samples of these media were tested for filtration efficiency.

Figure 7A:
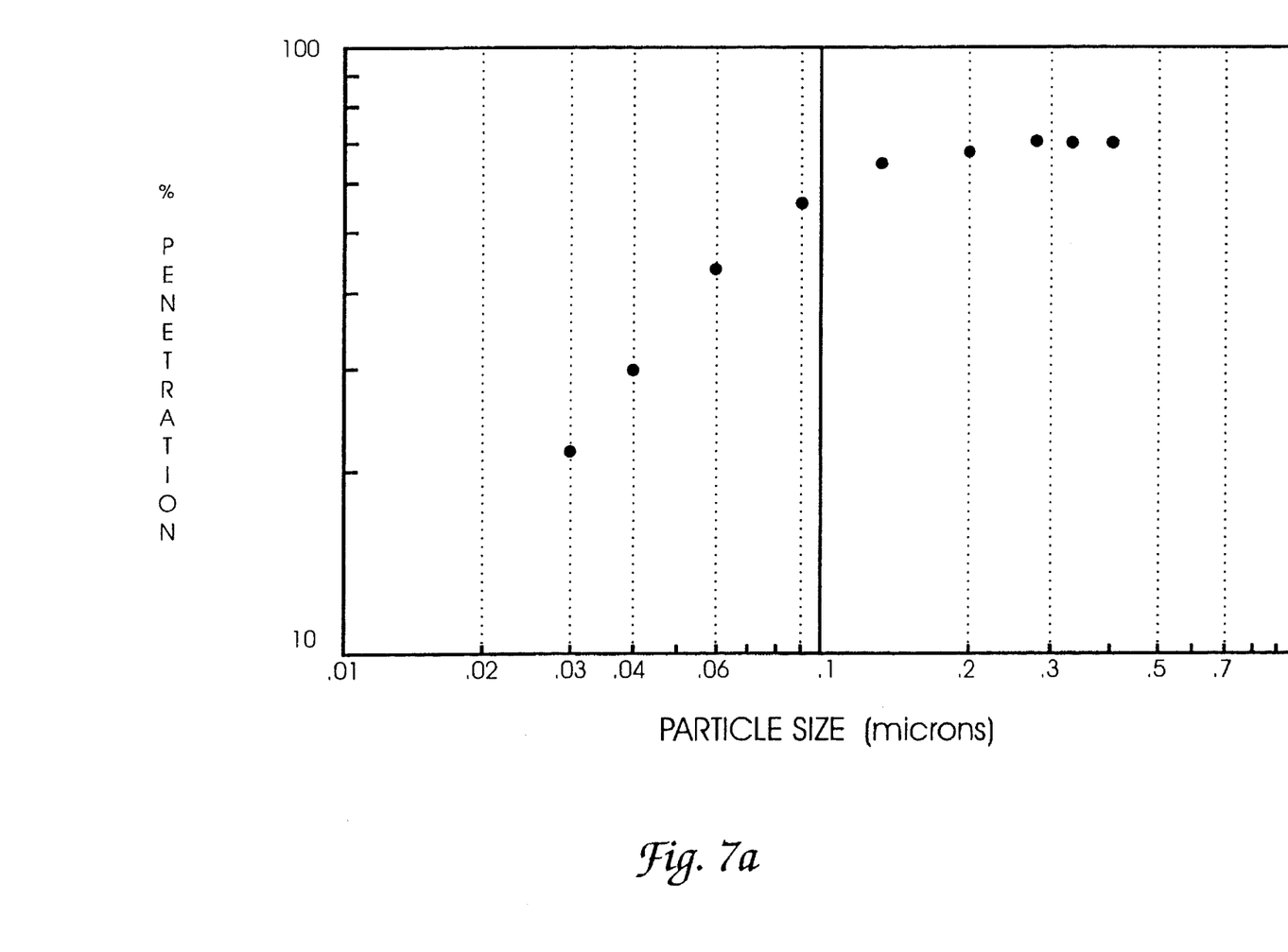
FIG. 7a is a graph of the filtration efficiency of a virgin polypropylene electret web of Example 7.
Figure 7B:
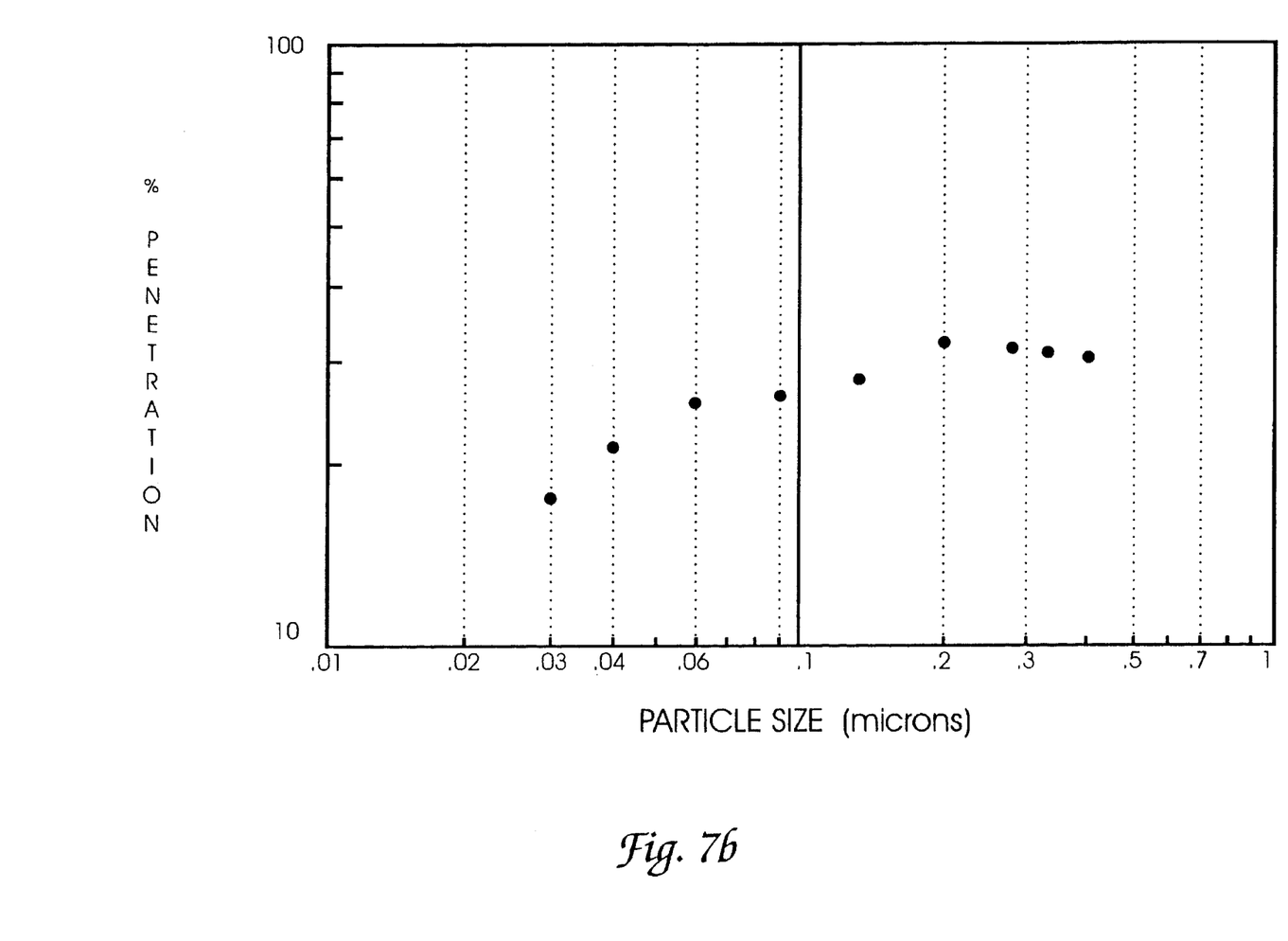
FIG. 7b is a graph of the efficiency of a web containing polypropylene with 5% of triphenylmethane of Example 7.

FIG. 7a represents the filtration efficiency of a virgin polypropylene electret web while FIG. 7b represents the efficiency of a web containing polypropylene with 5% of the triphenylmethane compound noted above. The efficiency of the triphenylmethane media was better than twice that of Virgin PP over the difficult to filter 0.1 to 0.4 micron range. Below 0.1 micron, efficiencies of media are expected to be similar, due to the fact that these small particles are in large part captured by Brownian motion.

We claim:

1. A polymer electret having a significant fraction of field-induced polarization after removal of a polarizing field comprising a mixture of (a) a polymer selected from the group consisting of polypropylene, polyethylene, and polyesters; and

(b) a charge control agent selected from the group consisting of a triphenylmethane having the formula an arylsulfide compound having the formula and an azochromium complex having the formula

* * * * *